United States Patent [19]

Yanagawa et al.

[11] Patent Number: 4,764,189
[45] Date of Patent: Aug. 16, 1988

[54] AIR DRYER APPARATUS FOR USE WITH PNEUMATIC OPERATIVE DEVICE

[75] Inventors: Ichiro Yanagawa; Yuzi Wachi, both of Higashimatsuyama, Japan

[73] Assignee: Jidosha Kiki Co., Ltd., Japan

[21] Appl. No.: 109,463

[22] Filed: Oct. 15, 1987

[30] Foreign Application Priority Data

Oct. 24, 1986 [JP] Japan .................. 61-253191
Dec. 16, 1986 [JP] Japan .................. 61-193585

[51] Int. Cl.⁴ .................................. B01D 53/04
[52] U.S. Cl. .................................. 55/163; 55/21; 55/316
[58] Field of Search ............... 55/33, 21, 162, 163, 55/316

[56] References Cited

U.S. PATENT DOCUMENTS

| | | | |
|---|---|---|---|
| 3,080,693 | 3/1963 | Glass et al. | 55/163 |
| 3,937,602 | 2/1976 | Hewitt et al. | 55/163 |
| 4,713,094 | 12/1987 | Yaragawa et al. | 55/163 |

Primary Examiner—Charles Hart
Attorney, Agent, or Firm—McGlew and Tuttle

[57] ABSTRACT

An air dryer apparatus for making use of exhaust air from pneumatic operative devices as purging air, wherein the outlet opening of the air dryer apparatus and the exhaust port of the pneumatic devices are put in communication with each other by way of a purging passage, and wherein there are provided a second check valve means on the way of the purging passage means in such a manner that the forward working direction thereof may be headed towards the outlet opening of the air dryer apparatus; and exhaust valve means having an exhaust valve body formed integrally with the valve body of the purge valve, and adapted to operate in such a manner that the exhaust valve body is opened when the purge valve body is in a closed position, while the exhaust valve body is closed when the purge valve body reaches a preset degree of opening, or more specifically, so that the closing operation of the exhaust valve means at the time of purging operation may be provided upon the opening of the purge valve; and wherein the second check valve means has its upstream side connected operatively to the upstream side of the exhaust valve means.

6 Claims, 8 Drawing Sheets

AIR DRYER APPARATUS FOR USE WITH PNEUMATIC OPERATIVE DEVICE

FIELD OF THE INVENTION AND RELATED ART STATEMENT

The present invention relates in general to an air dryer apparatus for use with a pneumatically operative device, and more particularly to an air dryer apparatus for making use of exhaust air from the pneumatic device available as purging air for the regeneration of desiccating agent stored in the air dryer apparatus, which is specifically designed to make the closing of an exhaust valve at the time of purging operation only upon the opening of a purge valve.

The air dryer unit is in general adapted to remove water and oil contents entrained in compressed air discharged from a pneumatic device, which is an indispensable unit for the attainment of the due durability and reliability of units involved in a pneumatic device. This air dryer apparatus is, in brief, of such a typical construction that it is of a container filled up with a desiccating agent in itself and is adapted to be disposed on the way of a passage extending from a pneumatic device to an air tank. In this typical arrangement, the air dryer apparatus is designed to dry the desiccating agent to regeneration by forcibly introducing purging air through an orifice to be decompressed while being expanded, every time that the current pressure within an air tank reaches a predetermined upper limit point.

Incidentally, it is one outstanding problem in the air dryer design how to maintain purging air without effecting any undesired influences upon the air supply. More specifically, if and when compressed air is let as purge air turned directly back to the air dryer side, it is inevitable that there may occur a substantial reduction in the pressure of the air tank, or else if a purging subtank is provided to avoid such a pressure drop intermediate the air dryer apparatus and a main tank, there will inevitably be an increase in cost or a requirement for an additional space for the installation of this subtank.

As a consequence, it is proposed in the recent air dryer design that exhaust air from the pneumatic device is utilized as purging air for the regeneration of desiccating agents. Referring to FIG. 8 which shows a typical example of known arrangement as disclosed in the Japanese Patent Laid-Open Application No. 145,060/1979, wherein it is designed that exhaust air from the brake actuator 5 is discharged to the atmosphere by way of a route from the brake actuator through a passage 151, a first switching valve 152, a passage 153, a second switching valve 154, a check valve 155, a passage 156, a desiccating agent chamber 157 of an air dryer 2, and a purge valve 158. According to this arrangement, there is required no subtank for purging air. Further to this arrangement shown in FIG. 8, there are shown provided an air compressor designated at the reference numeral 1, a governor (a pressure control device) at 6, an air tank at 3, a sub air tank at 159 and a brake valve at 160.

According to the conventional arrangement of air dryer apparatus as shown typically above, it is known that this air dryer apparatus is more or less subject to such drawbacks as follows. Reviewing more specifically to this arrangement of the air dryer apparatus, exhaust air from the brake actuator 5 is, when in a nonpurging condition, discharged outwardly from an exhaust outlet opening 161 of the second switching valve 154, and when in a purging position, the outlet opening 161 is closed upon the receipt of a pressure signal from the governor 6 putting the passages 153 and 156 in intercommunication, while opening the purge valve 158 upon the receipt of the pressure signal from the governor 6. In this manner, while there is effected a due purging operation with the operation of the two valves such as the second switching valve 154 and the purge valve 158, it is not always certain as to the establishment of a due accordance in the operation timing of these two valves in practice. Under a certain condition, there is a possibility such that the second switching valve 154 would be put to operation if the purge valve 158 is left closed from its irregularity in operation, thus making it inoperative to let the brake actuator exhausted, accordingly.

Should there be such a situation, the returning motion of the brake actuator 5 is made inoperative, which would undesirably result in a dragging condition of the vehicle's brake system, wherein the brake is left in an engaged position.

In addition, as the air dryer apparatus mentioned above is adapted to make use of exhaust air from the brake actuator 5 as purging air, it give rise to a purging operation only when a vehicle's brake is used. With this construction, a less frequent use of the vehicle's brake would naturally make the air purging operation less frequent in use correspondly, thus resulting in the possibility of an unsatisfactory regeneration of the desiccating agent within the air dryer apparatus. In this respect, therefore, according to the conventional arrangement as typically shown in FIG. 8, there is additionally provided a purge chamber 162 in the air dryer 2, and the above-mentioned problem of insufficient purging air would be met by having compressed air stored within this purge chamber 162 ejected continuously into a desiccating agent storage chamber 157 through an orifice 163.

With this construction, however, a whole quantity of exhaust air from the brake actuator 5 would be introduced into an orifice 163 in a purging operation in an arrangement such that the purge chamber 162 is disposed in series with the passage 156, which would very possibly make the vehicle's brake slow and dull in response in operation.

OBJECT AND SUMMARY OF THE INVENTION

In an attempt to cope with such an undesired problem inherent to the conventional arrangement of the air dryer apparatus, the present invention is essentially directed to the provision of an efficient solution to such problem. Therefore, it is a primary object of the invention to provide an improvement of the air dryer apparatus in which the closing operation on the part of the exhaust system of a pneumatic device is made only upon the opening of a purge valve.

The above-mentioned object of the present invention can now be attained from an improvement in the construction of an air dryer apparatus for use with a pneumatic device wherein compressed air delivered from an air compressor is stored in an air tank through a first check valve, after passing through the air dryer apparatus having a purge valve on its inlet side, and thus-stored compressed air within the air tank is then supplied to the pneumatic device, and wherein the current pressure within the air tank is detected having reached either a preset upper limit level or a preset lower limit level by way of a fluid pressure governor so that the air compressor and the purge valve can be controlled on the basis of thus-detected results, the improvement, as summarized in brief;

(a) the air dryer apparatus and the pneumatic devices are provided in communication with each other at the outlet opening of the air dryer apparatus and at the exhaust ports of the pneumatic devices by way of purging passage means;

(b) there are provided second check valve means on the way of the purging passage means in such a manner that its forward working direction may be headed towards the outlet opening of the air dryer apparatus; and (c) exhaust valve means having an exhaust valve body formed integrally with the valve body of the purge valve, and operable in such a manner that the exhaust valve body is opened when the purge valve body is in a closed position, while the exhaust valve body is closed when the purge valve body reaches a preset degree of opening; and (d) wherein the second check valve means has its upstream side connected operatively to the upstream side of the exhaust valve means.

According to an improvement in the arrangement of the air dryer apparatus for use with the pneumatic device by way of a preferred embodiment of the present invention, there may efficiently be attained a smooth returning motion or a quick disengagement in operation of the pneumatic device with not possibility of troubles in exhaustion operation from the pneumatic device at all.

In addition, according to another preferred embodiment of the invention, there are provided a third check valve and a purge chamber in series in the upstream of the passage connecting operatively the air dryer's outlet and the first check valve, thus making this purge chamber and the air dryer's outlet in an intercommunicating relationship through an orifice.

By virtue of such arrangement of this embodiment, purging air stored in the purge chamber is introduced into the air dryer after having passed through the orifice to be exhausted to the atmosphere. In this manner, as it is arranged that not only exhaust air from the pneumatic device but also purging air ejected out of the purge chamber are introduced duly into the air dryer apparatus, there is no risk such that the desiccating agent is not regenerated satisfactorily with a less frequent use of the pneumatic device during the operation.

Moreover, it is specifically arranged such that exhaust air from the pneumatic device is directed immediately into the outlet side of the air dryer not through an orifice in its passing route, the quick returning action of the pneumatic device to its non-operating position may be attained accordingly. Furthermore, for such a condition that exhaust air from the pneumatic device is under a relatively high pressure, it is arranged that part of this exhaust air may be stored in the purge chamber by way of the third check valve, which storage of air is later released passing gradually through the air dryer by way of the orifice, thus ensuring an efficient regeneration of the desiccating agent during the operation.

Other objects and advantages of the present invention will now become more apparent to those skilled in the art, when considering the following detailed description of preferred embodiments exemplifying the best mode of carrying out the invention as presently perceived. The detailed description refers particularly to the accompanying drawings, in which like parts are designated at like reference numerals.

BRIEF DESCRIPTION OF THE DRAWINGS

FIGS. 1 through 7 show preferred embodiments of an improved air dryer apparatus for use with a brake actuator according to the present invention; in which FIG. 1 is a schematic diagram showing generally a pneumatic circuit of an air dryer apparatus;

FIG. 2 is a lingitudinal cross-sectional view showing an air dryer apparatus according to a first embodiment of the invention;

FIG. 3 is a schematic view showing the left-half part, in cross-section, of an air dryer apparatus taken along the plane designated by the line A—A in FIG. 2;

FIG. 4 is a longitudinal cross-sectional view showing an air dryer apparatus according to a second embodiment of the invention;

FIG. 5 is a similar longitudinal cross-sectional view showing an air dryer apparatus according to a third embodiment of the invention;

FIG. 6 is a schematic view showing the left-half part, in cross-section, of an air dryer apparatus according to a fourth embodiment of the invention;

FIG. 7 is a schematic view showing the left-half part, in cross-section, of an air dryer apparatus taken along the plane designated by the line B—B in FIG. 6.

DETAILED DESCRIPTION OF PREFERRED EMBODIMENT

Figure 1:
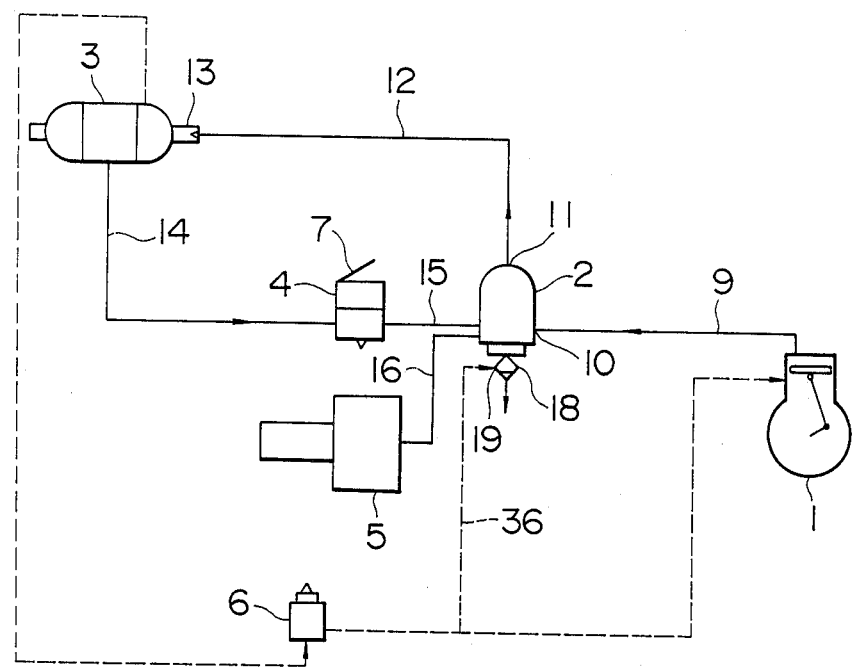

The present invention will now be explained in more detail by way of preferred embodiments thereof in conjunction with the accompanying drawings. Referring first to FIG. 1, which is a schematic diagram showing generally the pneumatic circuit of an air dryer apparatus which is improved in construction in accordance with the invention, wherein there are shown an air compressor designated at the reference numeral 1, an air dryer apparatus at 2, an air tank at 3, a pneumatic brake valve at 4, a brake actuator working as a kind of pneumatically operative apparatus, an air pressure governor at 6, and a foot pedal 7 of the pneumatic brake valve 4. It is arranged that compressed air delivered from the air compressor 1 is then fed into the inlet opening 10 of the air dryer 2 by way of a passage or conduit line 9, and dehumidified and deoiled while passing through the air dryer 2, and then supplied into the air tank 3 passing through the passage 12 from the outlet opening 11 of the air dryer 2. Also, there is provided a first check valve 13 at the entrance to the air tank 3.

It is seen that the air tank 3 and the pneumatic brake valve 4 are connected by way of the passage or conduit line 14, and also that the pneumatic brake valve 4 and the brake actuator 5 are connected with each other by way of the passages 15, 16 and a duplex check valve 17 disposed below the air dryer 2 which is to be described later. It is It is constructed in such a manner that compressed air may be supplied and discharged to and from the pneumatic brake actuator 5 by the operation of the pneumatic brake valve 4.

On the other hand, the current pressure level of the air tank 3 is detected by the air pressure governor 6, and when the pressure within the air tank 3 reaches a preset upper limit point, the control pressure as controlled by the pressure governor 6 to a predetermined level is fed to a pilot port 19 of an purge valve 18 and to the control section of the air compressor 1, whereby the purge valve 18 is opened and the air compressor 1 is stopped in operation, when so required. Also, at the moment that the current pressure of the air tank 3 decreases down to a preset lower limit level, the above-mentioned control pressure is given to close the purge valve 18 and to start the operation of the air compressor 1, respectively.

Figure 2:
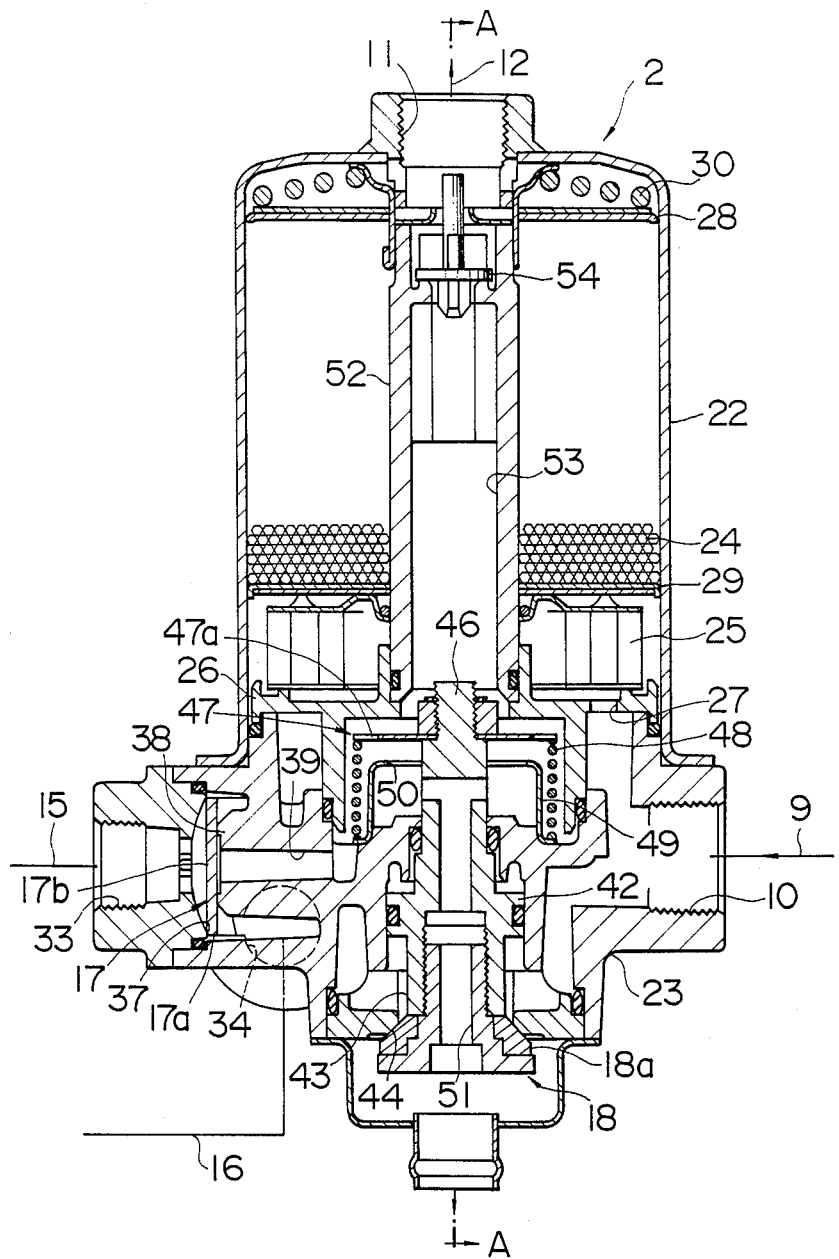
Figure 3:
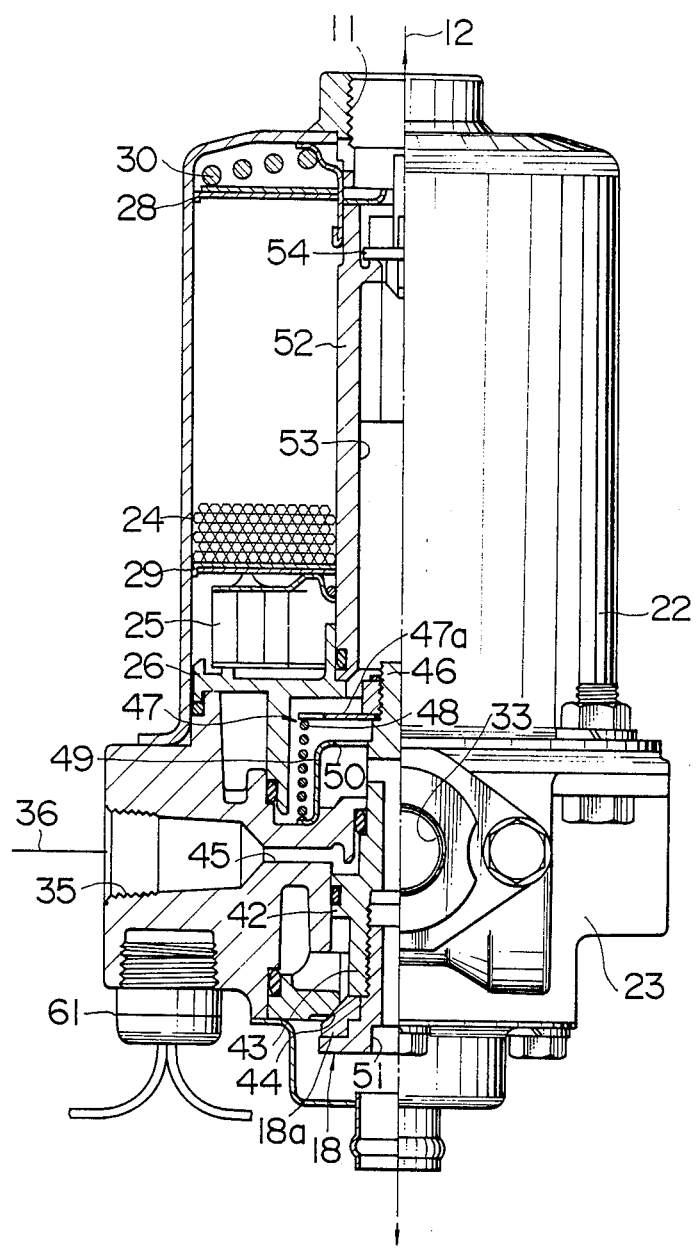

Next, reference is made more specifically to the construction of the air dryer 2 by way of FIGS. 2 and 3. FIG. 2 is showing the longitudinal cross-section and FIG. 3 is the left-half section in cross-section of the air dryer apparatus taken a long the plane designated by line A—A in FIG. 2, respectively. As shown in the drawing figures, the air dryer 2 is constructed generally from a cylindrical casing 22 and a lower body portion 23 mounted in the lower position of the casing 22. In the upper end of the casing 22, there is provided an outlet opening 11, to which the passage or conduit line 12 is connected operatively. On the other hand, on the lateral side of the lower body portion 23, there is provided the inlet opening 10, to which there is the passage or conduit line 9 connected operatively.

There is a lot or heap of desiccating agent 24 stored in the inside of the casing 22, and below the stock of this desiccating agent 24 disposed is an oil filter element 25. The lower portion of the casing 22 is in communication with the inlet opening 10 by way of an opening 27 defined in a bulkhead 26, through which compressed air fed into the inlet opening 10 may be directed to the outlet opening 11 passing through the oil filter 25 and the layer of desiccating agent 24. Incidentally, the stock of desiccating agent 24 is disposed in sandwiched relationship between an opposed pair of keep plates 28, 29 under the appropriate compressive force of a resilient spring 30.

On the lateral side of the lower portion 23, there are seen formed a brake valve port 33 and a brake actuator port 34 as shown in FIG. 2, and also there is defined a governor port 35 as shown in FIG. 3, respectively. In addition, there are seen passages or conduit lines 15, 16 connected to these ports 33, 34, respectively, and the port 35 is in turn connected operatively to the pressure governor 6 by way of passage or conduit line 36.

Between the ports 33 and 34 disposed is the duplex check valve 17. This duplex check valve 17 comprises a rubber disc, the outer circumferential part 17a and the central part 17b of which is placed normally abutting slightly upon the seat surfaces 37, 38. One of these seat surfaces, 37 is defined on the way of the passage intercommunicating the ports 33 and 34, and is arranged in such a manner that the outer circumferential part 17a of the duplex check valve 17 may be caused to forcibly fit upon the seat surface 37 and the central part 17b thereof may be forced away from the seat surface 38. In the central portion of the other seat surface 38, there is connected the one end of a passage 39, having its opposit end normally communicating with the atmosphere by way of an exhaust valve 47 to be stated later, thus making the central part 17b of the duplex check valve 17 forced against the seat surface 38 and thus making the outer circumferential part 17a thereof forced away from the seat surface 37, respectively, with the pressure at the port 33 being relatively high.

In the central position of the lower body 23, there is disposed a piston with a both-ended rod shape 42 slidably in the vertical directions, on the lower rod portion 43 of which piston is mounted integrally with a purge valve body 18a. A discharge opening 44 to be closed by the purge valve body 18a and the lower surface of the piston 42 are respectively in communication with the inlet opening 10. The purge valve 18 is normally closed when the piston 42 is urged upwardly with the current pressure of the inlet opening 10 rendered upon the lower surface of the piston 42. On the other hand, the upper surface of the piston 42 is put in communication with the pressure governor port 35 through a passage 45 as shown in FIG. 3, and it is arranged such that when a control pressure from the governor 6 is rendered upon the upper surface of the piston 42, the current differential pressure as produced from the difference in the areas of its upper and lower surfaces (the upper surface has a greater area) may urge the piston 42 downwardly, thus causing the purge valve 18 opened.

To the upper rod portion 46 of the piston 42 connected integrally is an exhaust valve body 47a of a circular disc shape. This exhaust valve body 47a is lightly biased upwardly by the resilient force of the compression coiled spring 48, and with this construction, when a purging operation is completed, the resilient force of the spring 48 will then urge the purge valve 18 to be closed. Below the exhaust valve body 47a is disposed a cylindrical partition member 49 with an exhaust opening 50 formed in the top surface thereof, which opening is closed or opened by the motion of the piston 42 in the vertical directions along the axis thereof. It is to be noted that this valving motion is specifically designed as typically shown in FIGS. 2 and 3 such that the exhaust valve 47 is always held opened when the purge valve 18 is closed, and also that the exhaust valve 47 is made closed only when the purge valve 18 is opened to a predererimed range of opening.

There is also shown provided a passage 51 for exhaust air in the inside of the piston 42 along its axis, and between the inside of the diaphragm member 49 and almosphere are put in intercommunication through the passage 51, as viewed in the figure. On the other hand, there is disposed a pipe member 52 extending longitudinally in the center of the casing 22, through a purging air passage defined in which pipe 52 the outside as viewed in the figure of the partition 49 is connected operatively to the outlet opening 11 of the air dryer 2. In addition, there is provided a second check valve 54 having its forward working direction head towards the outlet opening 11 within the upper end of the pipe 52.

With such construction of the air dryer apparatus of the invention as stated above, it is seen that compressed air delivered from the air compressor 1 is introduced to the inlet opening 10 of the air dryer 2 by way of the conduit line 9 as shown in FIG. 1, and from this inlet opening 10 it is further directed through the opening 27 defined in the diaphragm 26 shown in FIG. 2 into the air dryer, in which it is dehumidified and deoiled by the desiccating agent 24, thereafter it being discharged from the outlet opening 11 and fed into the air tank 3 by way of the passage 12.

When the current pressure in the air tank 3 increases with the supply of thus-treated compressed air to reach a predetermined upper limit level, the pressure governor 6 detects this pressure condition, and then upon the receipt of a control pressure as so regulated by the pressure governor 6 in accordance with the results of detection thereby, the air compressor 1 is stopped in operation, and with a similar control pressure fed to the governor port 35 of the air dryer 2, whereupon the exhaust valve 47 is then put to a closed position. At this moment, with the improvement in construction wherein there is provided no purging air subtank according to the invention, there occurs no purging operation upon the opening of the purge valve 18. In contrast, the operation is such that there occurs an purging operation with duly dried-up exhaust air from the pneumatic brake actuator 5 upon the returning action thereof, accordingly.

More specifically, upon the stepping-down motion of the pedal 7 of the brake valve 4 shown in FIG. 1, compressed air in the air tank 3 is immediately fed into the brake valve port 33 of the air dryer 2, and this compressed air is in turn directed to the pneumatic brake actuator 5 by way of the duplex check valve 17, the brake actuator port 34 and the conduit line 16. Then, upon the release of the pedal 7, the pneumatic brake valve 4 is exhausted and there is introduced the atmospheric pressure into the port 33 thereof. In this manner, when there is a reduction in pressure in the port 33, exhaust air from the pneumatic brake actuator 5 is further directed into the outer circumferential portion of the partition member 49 by way of the duplex check valve 17 and the passage 39.

At this moment, if the exhaust valve 47 is in a closed position, exhaust air is then directed through the purging passage 53 within the pipe member 52, and forces the second check valve 54 opened to pass therethrough, and then is discharged to the side of the outlet opening 11, from where it is in turn directed through the desiccating agent 24 and the deoiling filter 25, thereafter being discharged outwardly by way of the purge valve 18. At this moment, moisture or oils existing on the stock of desiccating agent 24 and the deoiling filter 25 are entrained by the exhaust air out to the atmosphere, thus performing a due regeneration of the stock of desiccating agent 24 and the deoiling filter 25, accordingly. On the other hand, when the exhaust valve 47 is held in an opened position, the exhaust air is caused to be discharged outwardly by way of the exhaust air passages 51 in the piston 42.

By the way, with the advantageous construction such that the purge valve body 18a and the exhaust valve body 47a are mounted integrally on the piston 42, there is none of such undesirable deviation in the timing in operation between the purge valve body 18a and the exhaust valve body 47a, such as the latter held in a closed position while the former is closed, at all. Consequently, in an event that the closing timing of the exhaust valve 47 and the exhaustion timing of the pneumatic brake actuator 5 should turn to coincide with each other, there is no possibility of disturbance to the exhausting action on the part of the pneumatic brake actuator 5, as the purge valve 18 is necessarily held in an open position at this moment, thus affording a smooth release of the vehicle's brake, accordingly.

Figure 4:
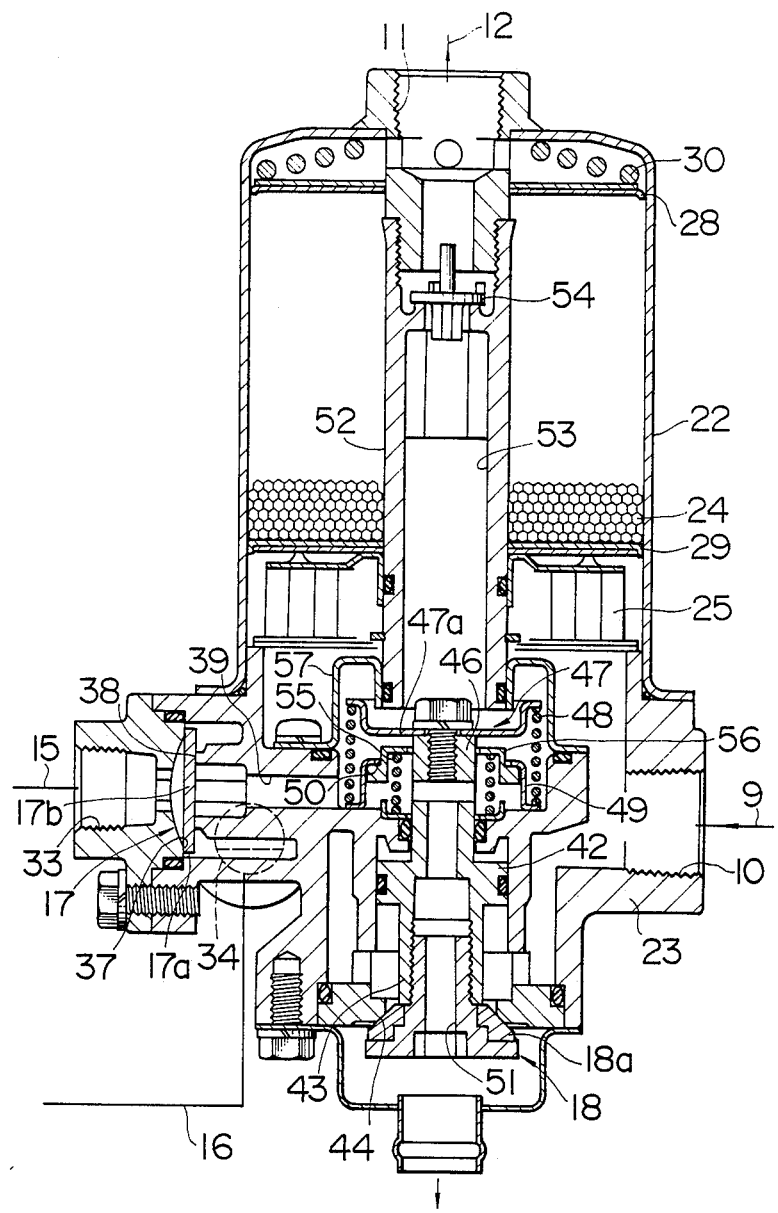

While the detailed description is made herein upon the present invention by way of a specific embodiment thereof, it is to be understood that the invention may be reduced in practice in various ways without being restricted to this specific embodiment thereof, but many other modifications and changes may be made without departing from the spirit of the invention. In this connection, FIG. 4 is a schematic view showing a second embodiment of the present invention, wherein the timing of closing the exhaust valve 47 is delayed slightly by function of the delay spring 55. Referring more specifically to this embodiment, it is arranged that a valve receiving member 56 biased upwardly by the urging force of the delay spring 55 is put into an operative engagement with the exhaust outlet 50 of the partition member 49, and the exhaust valve body 47a abuts upon the valve receiving member 56 before it comes to close the exhaust outlet 50, and that the velocity of lowering (valve-closing) action of the exhaust valve body 47a may be delayed to a substantial extent by the urging force of the delay spring 55. With such arrangement, if the closing timing of the exhaust valve 47 is delayed, the major portion of the high pressure air remaining in the casing 22 is forced out of the purge valve 18, and consequently, it is practicable to increase an exhausting rate that exhaust air from the pneumatic brake actuator 5 may be forced outwardly through the stock of desiccating agent 24 and the deoiling filter 25, so that there may thus be attained a quick brake releasing action, accordingly. Incidentally, the bulkhead member 57 shown in FIG. 4 is adapted to provide for the similar function to that of the bulkhead member 26 shown in FIGS. 2 and 3.

Figure 5:
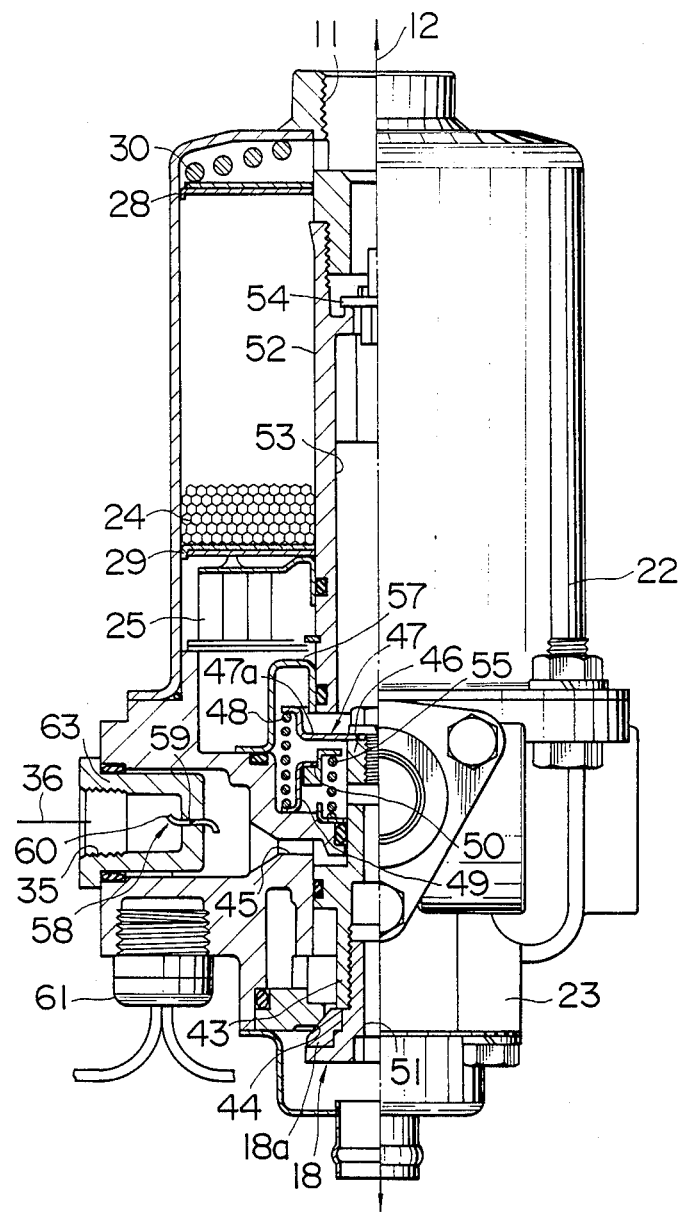

FIG. 5 is a schematic view showing partly in crossection a third embodiment of the present invention, which is directed to the provision of means to delay the timing of closing operation of the exhaust valve 47 in the second embodiment of the invention, and which is different in construction in the aspect that there is added an orifice 58 to the construction of the second embodiment. More specifically, it is constructed in such a manner that the orifice 58 is disposed on the midway of the passage extending from the pressure governor port 35 to the upper surface of the piston 42, having a fitting member 63 with the port 35 defined therein and having a wire 60 inserted into a through opening 59. With the orifice 58 disposed in this manner, a control pressure may be delayed in being rendered upon the upper surface of the piston 42, consequently resulting in a further delay in the lower action of the piston 42 and hence the closing action of the exhaust valve body 47a, and therefore, a substantial quantity of high pressure air remaining in the casing 22 would positively be discharged out of the purge valve 18, thus ensuring in a quicker brake releasing action, accordingly.

In FIGS. 3 and 5, there is shown provided a temperature sensor at the reference numeral 61, by which sensor controlled is the current temperature of a heating means (not shown) for enhancing the efficiency of absorbing humidity of the stock of desiccating agent 24.

While in this embodiment the duplex check valve 17 is constructed comprising a rubber disc member, it is of course feasible that this duplex check valve 17 may comprise a common shuttle valve, and also that it may be provided separately of the air dryer 2.

In addition, it is needless to mention that the present invention is not adaptable only to the air dryer apparatus in use with the pneumatic brake actuator system, but also to any of the air dryer apparatus for use with varied pneumatic devices.

According to the air dryer apparatus for use with the pneumatic device of the present invention, it is now known that the purge valve is held in a closed position when in the non-purging operation, and that compressed air delivered from an air compressor is stored at an air tank by way of the air dryer, the compressed air stored in the air tank being ready to be fed into the pneumatic device, when so required. At this moment, exhaust valve is in an open position, and exhaust air from the pneumatic device is forced out of this purge valve.

On the other hand, when the pressure in the air tank increases and reaches the predetermined upper limit level, the pressure governor means operates to detect such a pressure condition, and following the results of such detection, the air compressor is stopped in operation and the purge valve is opened. In this operation, the purge valve body and the exhaust valve body 47 work as a unit, having the exhaust valve body closed necessarily upon the opening of the purge valve body. As a consequence, there is no risk of hindrance or obstacle to the exhaustion from the pneumatic device in the system, and there is attained the advantageous effect of smooth and quick returning or releasing action of the pneumatic device, accordingly.

When the purge valve is opened and the exhaust valve is closed during the operation, exhaust air from the pneumatic device is then directed into the air dryer, flowing in the direction from the outlet to the inlet thereof, thereafter being discharged out of the purge valve. Moisture and the like absorbed by the desiccating agent may be entrained by the exhaust air and discharged outwardly, thus performing the regeneration of the desiccating agent, accordingly.

As the purge valve and the exhaust valve are formed integrally with their valve bodies in the manner as stated hereinbefore, there is at all no possibility of skew or discordance in the timing of operations therebetween, and furthermore, it is advantageously arranged that the exhaust valve body is closed necessarily upon the completion of the opening action on the part of the purge valve body. With this specific arrangement, there is no chance of hindrance in the exhausting operation from the pneumatic device in the system as experienced in the conventional construction, thus ensuring a smooth releasing action of a pneumatic brake system with the employment of, for example, an air dryer apparatus for use with an pneumatic brake actuator.

Figure 6:
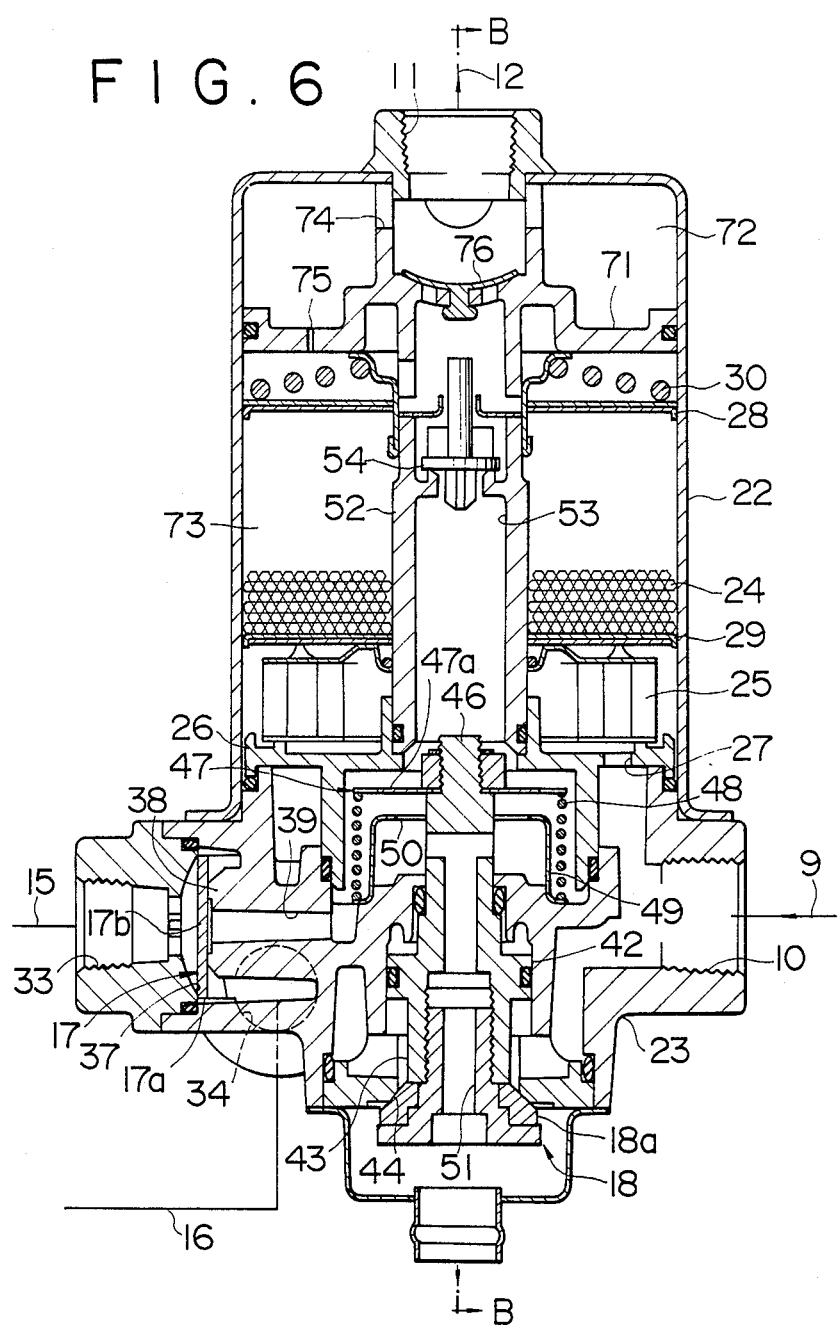
Figure 7:
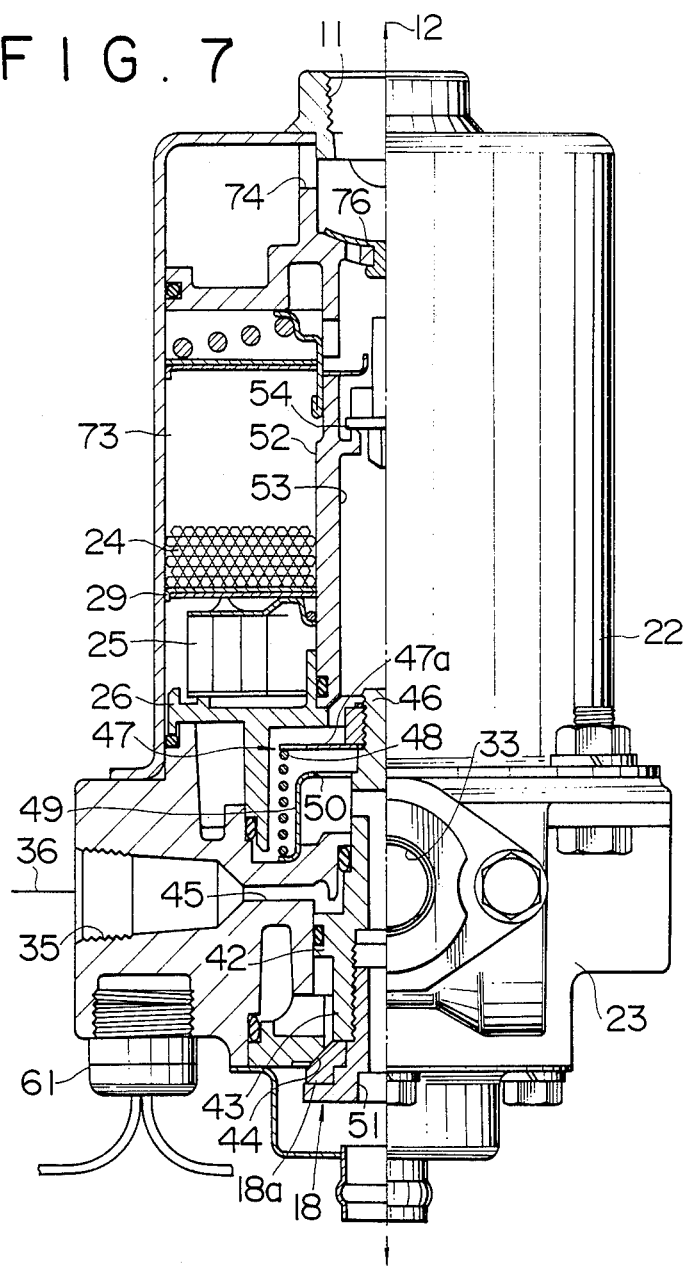
Figure 8:
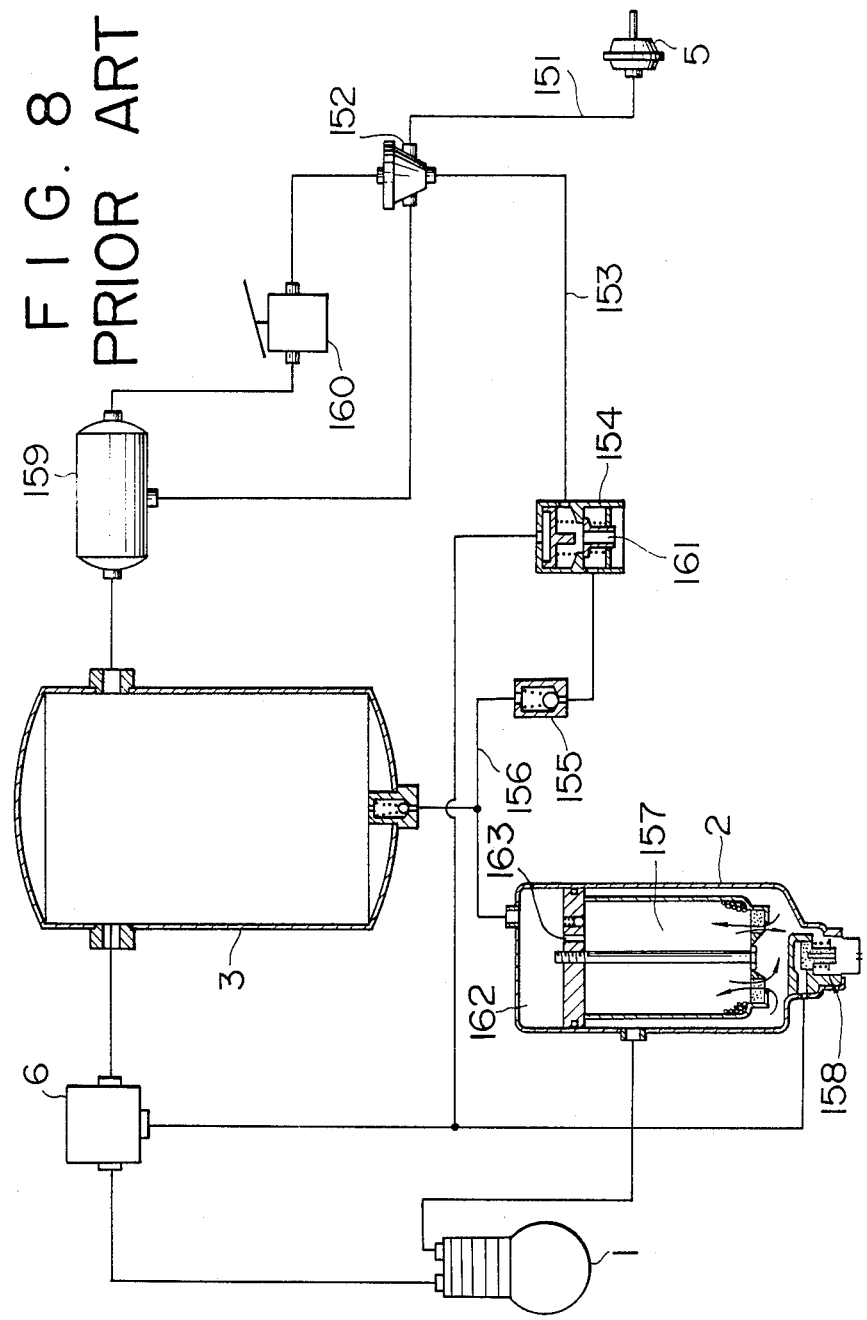
FIG. 8 is a pneumatic circuit diagram showing the general construction of the conventional air dryer apparatus.

Now, referring is made to FIGS. 6 and 7, which show a fourth embodiment of the invention. In these drawing figures, like parts similar to those shown in FIGS. 2 and 3 are designated at like reference numerals, and explanation will be omitted for the sake of clarity.

The casing 22 is separated into upper and lower chambers by way of a bulkhead 71, the upper chamber being a purge chamber 72 and the lower chamber a desiccating agent storage chamber 73. In the bulkhead 71 there are provided a communicating opening 74, an orifice 75 and a third check valve 76, respectively. The purge chamber 72 is put in communication with the outlet opening 11 by way of a communicating opening 74, and also in communication with the desiccating agent storage chamber 73 by way of the orifice 75, the desiccating agent storage chamber 73 being in communication with the outlet opening 11 by way of the third check valve 76, respectively.

There is stored a stock of desiccating agent 24 in the inside of the desiccating agent storage chamber 73, and below this stock of desiccating agent 24 is disposed the deoiling filter 25. It is arranged such that the lower portion of the casing 22 is put in communication with the inlet opening 10 by way of the opening 27 defined in the diaphragm 26, compressed air fed into which opening 10 being directed to the outlet opening 11 passing through the deoiling filter 25 and the stock of desiccating agent 24. Incidentally, the stock of desiccating agent 24 is sandwiched by the opposing pair of meshed keep plates 28, 29, and subject to an appropriate compression under the spring 30.

Next, reference is made to the operation of the air dryer apparatus according to the present invention. Compressed air delivered from the air compressor 1 is fed into the inlet opening 10 of the air dryer 2 by way of the passage 9, from where it is directed through the openings 27 defined in the bulkhead 26 to the air dryer 2 as shown in FIG. 6, in which it is dehumidified and deoiled while passing through the stock of desiccating agent 24 and the deoiling filter 25, thereafter it being redirected through the third check valve 76 to the outlet opening 11, from which exhaust air is fed through the passage 12 to the air tank 3. A part of compressed air is directed through the communicating opening 74 to be taken-off and stored in the purge chamber 72.

When the current pressure in the air tank 3 increases by the supply of compressed air and reaches the predetermined upper limit level, it is arranged that the pressure governor 6 operates to detect such a pressure condition, and following thus-obtained results of detection, a due control pressure as adjusted by the pressure governor 6 is fed to the control section of the air compressor 1 to stop the operation th ereof, while a similar control pressure is fed to the pressure governor port 35 of the air dryer 2 to first open the purge valve 18 and then to close the exhaust valve 47.

Upon the opening of the purge valve 18, purging air stored in the purge chamber 72 ejects through the orifice 75 to the desiccating agent storage chamber 73, then discharged to the atmosphere. During this operation, moisture and oils deposited on the stock of desiccating agent 24 and the deoiling filter 25 are then directed outwardly while being entrained by purging air, thus accomplishing the regeneration of the stock of desiccating agent 24 and the deoiling filter 25, accordingly.

On the other hand, it is also arranged such that when the pneumatic brake actuator 5 is actuated on its returning motion while the purge valve 18 is held opened, there is effected a due purging operation with dried-up exhaust air from the pneumatic brake actuator 5. Referring more specifically, in operation, when the pedal 7 of the pneumatic brake valve 4 is stepped down, compressed air stored in the air tank 3 is then supplied to the brake valve port 33 of the air dryer 2, this compressed air being directed in turn to the pneumatic brake actuator 5 passing through the duplex check valve 17, the brake actuator port 34 and the passage 16. Next, upon the release of the pedal 7, the pneumatic brake valve 4 is exhausted to introduce the atmospheric pressure into the port 33. At the moment that the current pressure in the port 33 decreased exhaust air from the pneumatic brake actuator 5 is then directed through the duplex check valve 17 and the passage 39 to the outer circumferential portion of the partition member 49.

If the exhaust valve 47 is held in a closed position at this moment, the above-mentioned exhaust air is now directed through the purging passage 53 in the pipe member 52 to force the second check valve 54, then entering into the desiccating agent storage chamber 73 and passing through the stock of desiccating agent 24 and the deoiling filter 25, and finally discharged outwardly. During this process, moisture and oils as deposited on the part of the stock of desiccating agent 24 and the deoiling filter 25 is entrained by exhaust air to be discharged outwardly, thus accomplishing a due regeneration of the stock of desiccating agent 24 and the deoiling filter 25, accordingly. With a relative high pressure of exhaust air part of exhaust air is stored in the purge chamber 72 by way of the third check valve 76, thereafter flowing gradually into the desiccating agent storage chamber 73 by way of the orifice 75. Compairing with the arrangement such that the whole amount of exhaust air is exhausted at once, there is attained a substantial improvement in the efficiency of regeneration of the desiccating agent in the system. On the other hand, when the exhaust valve 47 is held in the open position, the above-mentioned exhaust air is discharged outwardly by way of the exhaust passage 51 in the piston 42.

By the employment of the air dryer with such an advantageous construction according to the present invention, there may be attained the following advantageous effects as stated below, in addition to the advantage that there is no risk of hindrance in exhaustion of the pneumatic devices involved in the pneumatic brake system as described fully in connection with the first to third embodiments of the invention; that is, With the purge chamber of a small capacity corresponding to the consumption rate of the pneumatic devices involved in the brake system, it is practicable to establish a due supply of purging air to be made up, without affecting the efficiency of regeneration of the stock of desiccating agent.

Furthermore, with the advantageous arrangement such that exhaust air from the pneumatic device is immediately directed to the air dryer apparatus not by way of an orifice, there is attainable a quick returning action of the pneumatic devices involved in the system.

In addition, when with a relatively high pressure of exhaust air from the pneumatic devices involved in the system, part of this exhaust air may be stored in the purge chamber by way of the third check valve, and may thereafter be fed to flow gradually through the air dryer by way of an orifice, there is attainable a substantial improvement in the efficiency of regeneration of the stock of desiccating agent, as compared with the conventional arrangement such that the whole amount of exhaust air is discharged all at once.

It is also to be understood that the appended claimed are intended to cover all of such generic and specific features particular to the invention as disclosed herein and all statements relating to the scope of the invention, which as a matter of language might be said to fall thereunder.

What is claimed is:

1. In an air dryer apparatus use with pneumatic operative devices wherein compressed air delivered from an air compressor is stored in an air tank through a first check valve after passing through the air dryer apparatus having a purge valve on the inlet side thereof, and thus-stored compressed air within said air tank is then supplied to said pneumatic devices, and wherein the current pressure within said air tank is detected having reached either a preset upper limit level or a preset lower limit level by way of a fluid pressure governor so that the air compressor and the purge valve can be controlled on the basis of thus-detected results; an improvement (a) wherein said air dryer apparatus and said pneumatic devices are provided in communication with each other at the outlet opening of said air dryer apparatus and at the exhaust ports of said pneumatic devices by way of purging passage means;

(b) wherein there are provided second check valve means on the way of said purging passage means in such a manner that the forward working direction thereof may be headed towards the outlet opening of said air dryer apparatus; and (c) exhaust valve means having an exhaust valve body formed integrally with the valve body of said purge valve, and adapted to operate in such a manner that said exhaust valve body is opened when said purge valve body is in a closed position, while said exhaust valve body is closed when said purge valve body reaches a preset degree of opening; and (d) wherein said second check valve means has its upstream side connected operatively to the upstream side of said exhaust valve means.

2. An improvement relating to an air dryer apparatus for use with pneumatic operative devices as claimed in claim 1, wherein said exhaust valve means comprises a piston means having said purge valve mounted integrally thereon and having an exhaust passage means defined therein, an exhaust valve body mounted integrally on said piston means, a partition means disposed in communication with said exhaust passage means and having an exhaust opening means adapted to be closed by way of said exhaust valve body, and a coiled compression spring means mounted operatively between said exhaust valve body and said partition means.

3. An improvement relating to an air dryer apparatus for use with pneumatic operative devices as claimed in claim 2, which further comprises a valve body receiving means fitted into said exhaust opening defined in said partition means and a delay spring means adapted to urge said valve body receiving means towards said exhaust valve body, and operable in such a manner that said exhaust valve body abuts upon said valve body receiving means before said exhaust valve body is caused to close said exhaust opening means so as to delay the closing operation of said exhaust valve body under the urging force of said delay spring means.

4. An improvement relating to an air dryer apparatus for use with pneumatic operative devices as claimed in claims 2 or 3, which further comprises a passage means extending from a governor port for introducing a predetermined control pressure from said fluid pressure governor means to said piston means and defined an orifice on the way thereof, whereby the closing timing of said exhaust valve body is delayed to a predetermined extent.

5. An improvement relating to an air dryer apparatus for use with pneumatic operative devices as claimed in claim 4, which further comprises a wire means inserted into a small opening defined in a fitting means forming said governor port means so as to form said orifice means.

6. An improvement relating to an air dryer apparatus for use with pneumatic operative devices as claimed in claim 1, which further comprises a third check valve means and a purge chamber means disposed in serial relationship having the former in the upstream of the latter on a passage means connecting operatively the outlet opening means of said air dryer apparatus and said first check valve means, thereby to connect said purge chamber means and said outlet opening means of said air dryer apparatus in an intercommunication relationship with each other by way of an orifice means.

* * * * *